E. R. TAYLOR.
ELECTRIC SMELTING FURNACE.
APPLICATION FILED JULY 7, 1910.

985,226.

Patented Feb. 28, 1911.

Witnesses
Inventor
Edward R. Taylor
Attorney.

E. R. TAYLOR.
ELECTRIC SMELTING FURNACE.
APPLICATION FILED JULY 7, 1910.

985,226.

Patented Feb. 28, 1911.

Witnesses

Inventor
Edward R. Taylor
Attorney

UNITED STATES PATENT OFFICE.

EDWARD R. TAYLOR, OF PENN YAN, NEW YORK.

ELECTRIC SMELTING-FURNACE.

985,226.  Specification of Letters Patent.  Patented Feb. 28, 1911.

Application filed July 7, 1910. Serial No. 570,836.

*To all whom it may concern:*

Be it known that I, EDWARD R. TAYLOR, a citizen of the United States of America, and a resident of Penn Yan, in the State of New York, have invented a new and useful Improvement in Electric Smelting-Furnaces, of which the following is a specification.

This invention relates primarily to the electric smelting of oxid iron ores by a continuous process; but the improved electric furnace, and novel features thereof, may be used for effecting other reactions and reductions.

The present invention consists in the improved electric furnace hereinafter described, and certain novel combinations of parts therein, as more particularly set forth in the claims hereto appended.

This invention is additional to the improvements in electric furnaces set forth in my previous specifications forming part of United States Letters Patent No. 688364, dated December 10, 1901, and No. 938,351, dated October 26, 1909. The latter is hereinafter referred to as my companion specification.

The objects of the present invention common thereto and to said previous improvements, include the protection of horizontal or inclined electrodes, hereinafter referred to in common as "horizontal", against excessive wear, and the regulation of the electric action within the furnace, by means of fragmentary resistance regulating material fed by gravity upon said electrodes and between them; the prevention of the leakage of electricity, with reference to securing the maximum heating or electrochemical effect of the current; the interception and utilization to the utmost of heat that would otherwise be lost by radiation, and the avoidance of the cooling of the more highly heated inner part of the furnace in continuous reactions and reductions by the sudden introduction of cold material, so as to insure the continuity of the operation; the utilization in an effective manner of the alternating or two-phase electric current in such furnaces; and provision for varying the paths of the electricity through the charge within the working chamber so as to prevent the formation of piers of the less fusible ingredients of the charge, or to burn out such piers should they accidentally be formed.

Other objects common to the subject matter of said companion specification and the present invention are to meet and overcome certain difficulties that present themselves in the electric smelting of metals and other electrically conductive materials in a shaft furnace, and especially to keep the material of the charge between the electrodes from becoming so conductive of electricity as to reduce the resistance of the furnace below practical working limits; to separate the ore in the four quarters of a two-phase furnace of the preferred stack type and to keep the same separate, and thus to facilitate the manipulation of ore within the furnace; to provide for employing a large proportion of fine ore such as cannot be smelted in a blast furnace because of its liability to be blown out of the furnace by the blast; to provide for feeding fine and coarse ore downward in a stack furnace in separate vertical or substantially vertical columns; to utilize portions of the fine ore columns for the conservation of the heat of the furnace; to so regulate the feed of the ore as to properly utilize the energy liberated between the main electrodes without causing short circuits; to provide for admitting successive small quantities of fine ore into the outer edges of the coarse ore columns on their way to the heat zone; to provide for feeding suitable dry carbonaceous material for the charge, preferably either coke or charcoal, in a central column, and for utilizing lateral wings of such "coke column", as it is hereinafter termed, to separate the columns of coarse ore; to utilize such coke column as a resistance conductor between secondary electrodes located at the bottom and top of the furnace respectively; to provide in this way for starting the furnace with facility by the interaction of said secondary electrodes and said coke column; to keep the carbonaceous material of the charge incandescent to a greater height than has heretofore been practicable; to vary the height of such incandescence at will; to determine thus the percentage of carbon, for example, in the reduction of iron ores, so as to produce pig iron or steel as may be desired; to insure the formation of the weakest point in the main circuit between said horizontal electrodes at all times; to utilize the heat at this point for superheating the streams or globules of fluid metal as they trickle downward, so that they shall carry with them into the hearth sufficient heat to keep the metal in the hearth in a fluid condition; to provide for reheating the metal in the hearth in case of accident; to reduce ore to metal to as considerable an extent as may be possible in the fine ore before it reaches the heat zone; to promote the reduction of oxid iron ore by the circulation of the gases within the furnace, and to provide for the introduction of air or other oxidizing material into the center of the furnace, to burn out fortuitous accumulations of carbon or other oxidizable material which may interfere with the regular working of the furnace.

The leading objects peculiar to the present improvement are to provide for building the improved furnace with a cylindrical upper feed portion as compared with the downwardly flaring feed portion heretofore proposed, and thus to form vertical feed passages for the heat conserving streams of ore on its way to the heat zone and to accommodate feed hoppers, fine-ore passages and a gas chamber of relatively large capacity in a furnace of given diameter; to provide for subdividing the fine-ore passages, and insuring more positively the intermixture of the fine ore with the coarse ore on their way to the heat zone; to combine an upper cylindrical feed portion of large horizontal area with a relatively small hearth, without the aid of mechanical stroking means, or with such aid as the character of the gravity-fed material of the charge may demand; to dispense with metallic stems for horizontal electrodes of large size; to provide better means for keeping the inner ends of such electrodes at the most effective working distance apart; and to utilize such electrodes as means for the introduction of oxidizing material into the center of the working chamber to burn out fortuitous accumulations of carbon or other oxidizable material as aforesaid, or for other purposes.

Other objects will be set forth in the general description which follows.

Eight sheets of drawings accompany this specification as part thereof.

Like reference characters indicate like parts in all the figures.

The improved furnace is of a stack form; its internal structure, $a$, being built of suitable heat-resisting material, such as brick or cement, within a metallic shell, $b$, of iron or steel, hereinafter referred to as iron; and a layer, $c$, of a suitable incombustible non-conductor of electricity, such as asbestos, is interposed between the internal structure $a$ and the shell $b$ throughout.

Figure 2:
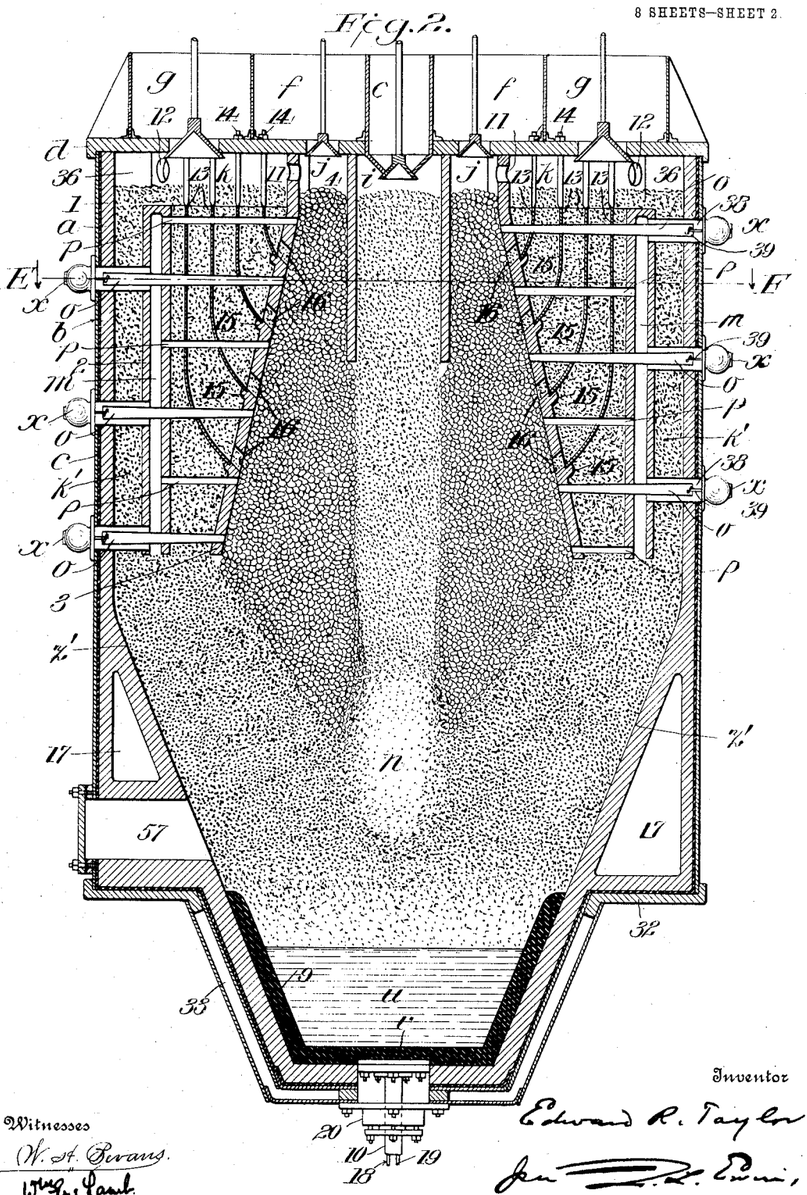
Figure 3:
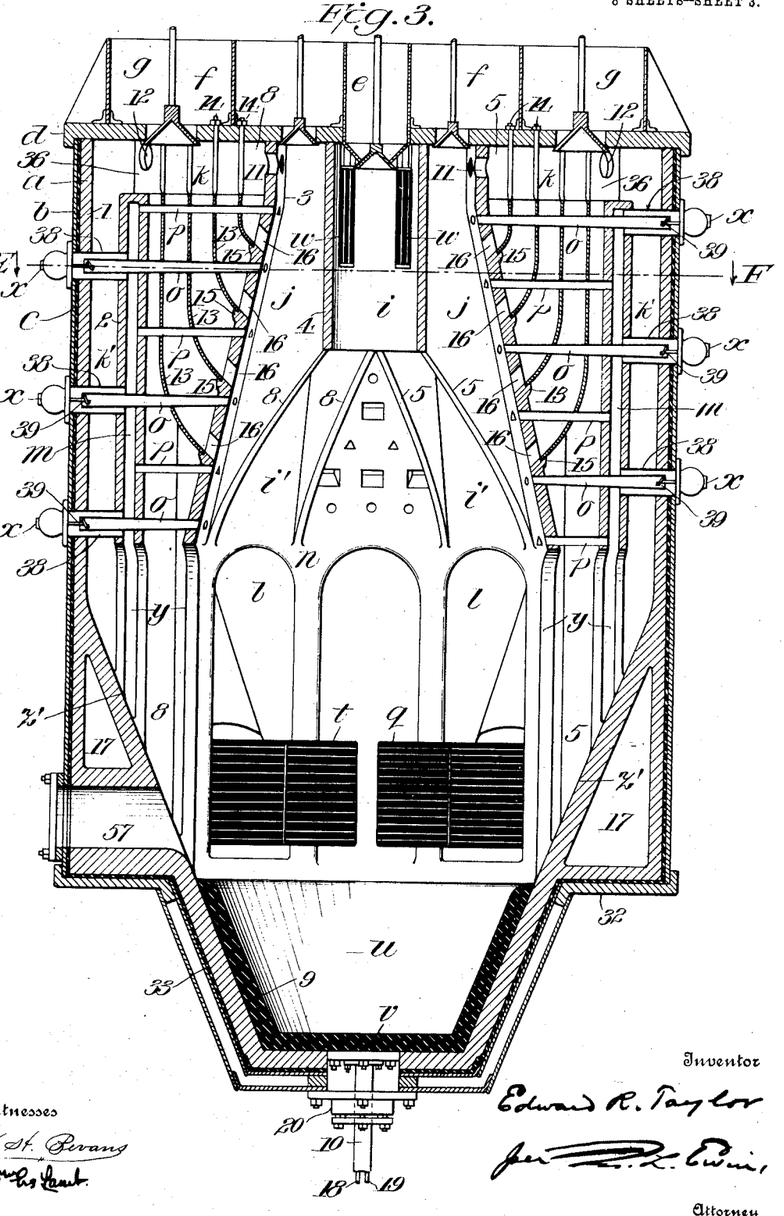
Fig. 3 represents the same vertical section as Fig. 2, showing the furnace empty.
Figure 4:
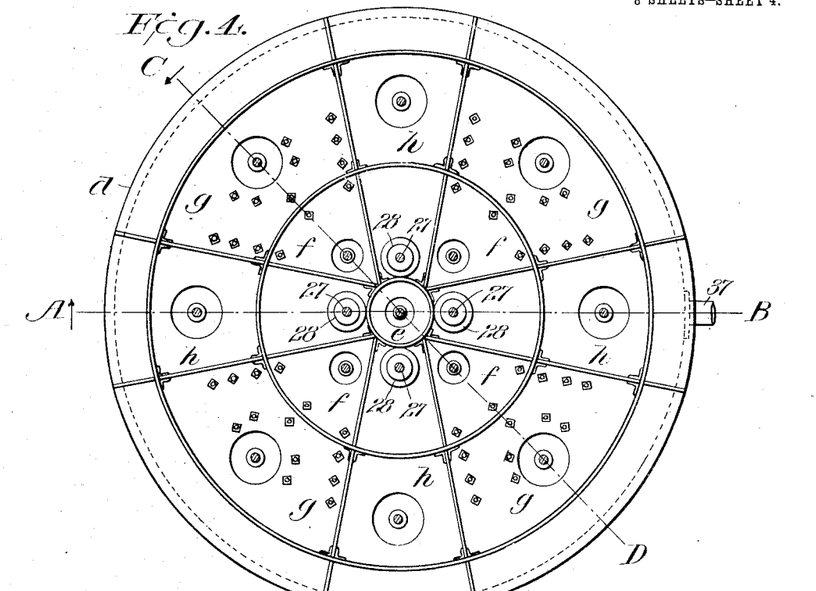
Figs. 4 and 5 are plan views respectively of the top of the furnace above and beneath its top plate, indicating by lines A—B and C—D the planes of Fig. 1 and of Figs. 2 and 3, respectively.
Figure 6:
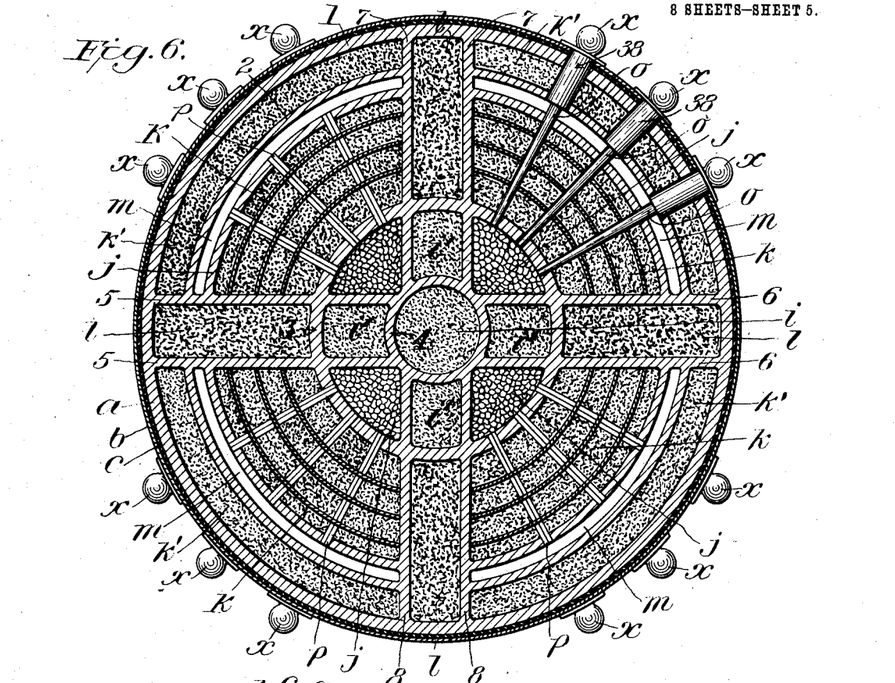
Fig. 6 represents a horizontal section on the lines E—F and E'—F', Figs. 1 and 2 and Fig. 8.

The top plate, $d$, of the shell $b$ and of the furnace is conveniently horizontal, and is provided with feeding hoppers, $e, f, g$ and $h$, best shown in Fig. 4, which are conveniently so shaped and so united with each other and with the top plate as to form a truss by which the subjacent top-plate is stiffened against sagging. The respective hoppers $e, f, g$ and $h$ communicate with the upper ends of flue-shaped passages, $i, j, k—k'$ and $l$, which extend downward within the internal structure $a$, and the hoppers $f$ and passages $j$, each of them four in number, in the specific construction represented by the drawings, are appropriated to the principal charge of ore, hereinafter referred to as the coarse ore, which is thus divided into several distinct columns. Another set of hoppers and passages, $g$ and $k—k'$, external to said coarse-ore passages, are appropriated to fine ore, and these fine-ore passages $k—k'$ are divided into main passages ($k$) and peripheral passages ($k'$) by hollow walls, forming a gas space, $m$, within each wall open at bottom and also in direct communication with the working chamber, $n$, by way of outwardly flaring gas tubes, $o$. The peripheral fine-ore passages, $k'$ communicate with the working chamber at their lower ends only, and are located peripherally, as shown in Figs. 2, 3 and 6, so that the body of fine ore within them may be as cool and as continuous as may be practicable, with reference to intercepting and utilizing radiant heat. The main fine-ore passages, $k$, are provided with baffle plates, $p$, Figs. 2 and 3, preferably V-shaped in cross section and arranged with the apex uppermost so as to retard the flow of the fine ore to a sufficient extent, and to form suitably distributed gas spaces through the body of fine ore.

Figure 1:
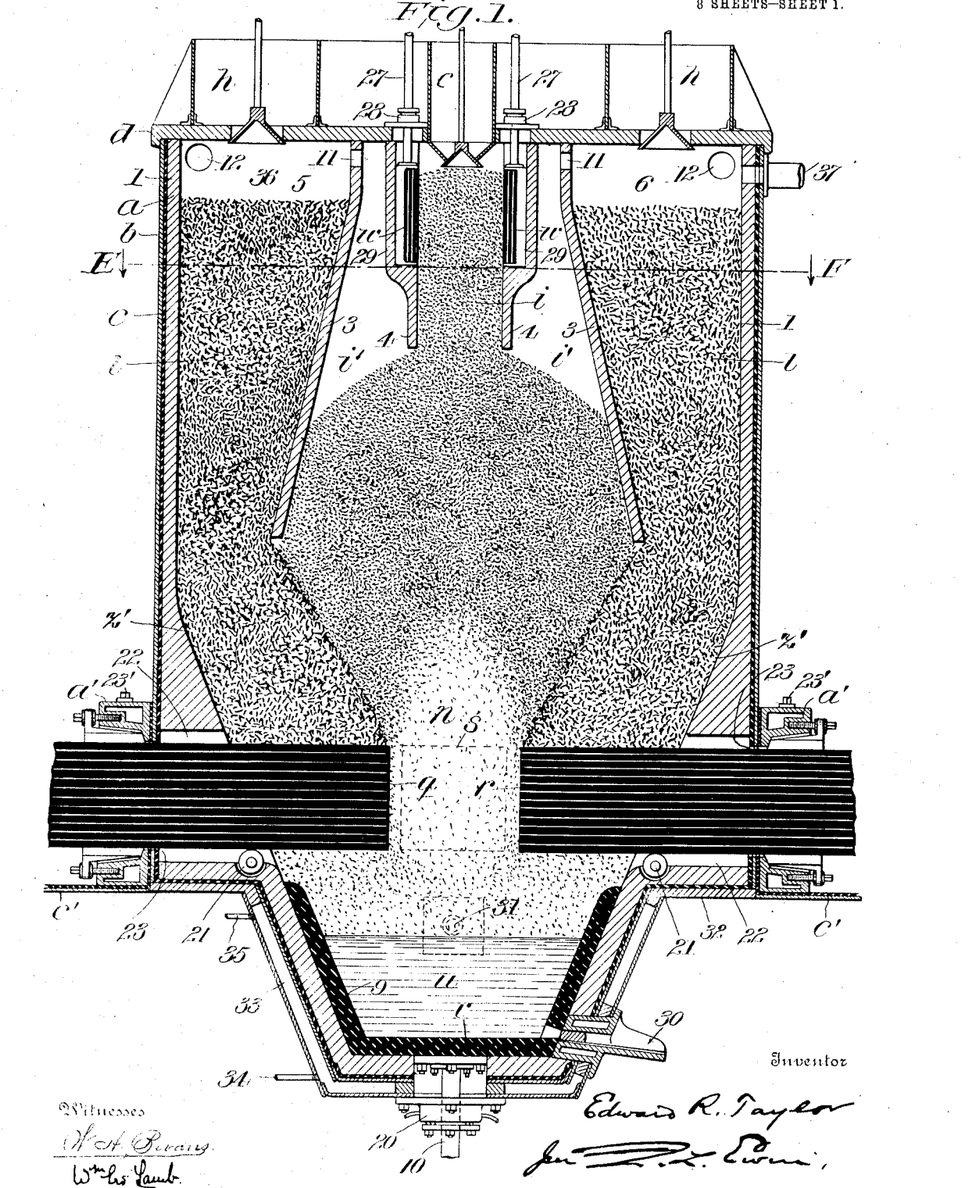
Figures 1 and 2 represent axial vertical sections in different planes through an electric smelting furnace embodying the present invention, and illustrating the smelting process.

The central hopper $e$ and the passage $i$ extending vertically therefrom are appropriated to suitable dry carbonaceous material, preferably charcoal or coke and hereinafter referred to as "coke". Said coke passage $i$ is formed by a central circular wall at the top of the furnace, and this wall is supported by partition walls in the form of flying buttresses arranged in pairs around said central wall, and forming between them where their inner edges are exposed below said circular wall, a wing-shaped passage, $i'$, in communication with said central passage $i$ above each of the main electrodes, so that the coke may spread laterally in the form of wings between and below said partition walls and extend the separation of the columns of coarse ore to the heat zone. The other four of said hoppers, shown at $h$ in Figs. 1 and 4, and the peripheral passages, $l$, leading downward therefrom, between said wing-shaped coke passages $i'$ and the outer wall of the furnace are appropriated to the feed of resistance regulating material adapted to flow downward by gravity and to protect the main electrodes and regulate the conductivity of the charge at the heat zone as set forth in the previous specifications hereinbefore referred to. I still prefer as such material broken electrode carbons reduced to suitable fragments by crushing, which insures a regulating material of greater conductivity than the charge of coke or charcoal. Said main electrodes $q$, $r$, $s$, and $t$ are preferably four in number and arranged in two pairs at right angles to each other and horizontal as aforesaid, and are located immediately above the hearth, $u$. Secondary electrodes, $v$ and $w$, are located respectively at the bottom and top of the furnace; the bottom electrode, $v$, having a carbon body, 9, which forms a lining for the hearth $u$ of the furnace, and is provided with a depending water-cooled metallic stem, 10. Such stem is suitably connected with water circulating pipes 18 and 19, the details of which may be of any known or improved description, and protrudes through a water-cooled stuffing-box, 20. The secondary electrodes, $w$, at the top of the furnace are preferably four in number, located above the respective main electrodes $q$, $r$, $s$ and $t$, and the metallic stem, 27, of each of such top electrodes extends upward through a water-cooled stuffing box, 28, on the top plate $d$ as shown in Figs. 1 and 4. The carbon bodies of the top electrodes are supported subjacently within pockets, 29, Fig. 1, formed in the walls of the central coke passage $i$, so that the face of the carbon body of each of these electrodes is substantially flush with the inner surface of said wall, and in contact with the charge of coke through which the electric current passes from the bottom electrode $v$ to the top electrodes $w$; the latter being of one polarity. The two sets of electrodes, that is to say the main electrodes, $q$, $r$, $s$, $t$, and the secondary electrodes, $v$, $w$, are preferably connected electrically with different dynamos; and the latter are preferably of the two-phase or alternating type for the main electrodes, at least.

The hearth $u$ is provided with an outlet, 30, through which to run off the fluid metal, and an outlet, 31, at a higher point, for molten slag. The hearth portion of the furnace is suspended from an annular metallic sill, 32, which may rest upon columns or the like in customary manner, and the depending portion of the hearth is preferably provided with a water jacket, 33, provided with suitably located inlet and outlet connections, 34 and 35, Fig. 1.

An annular gas chamber, 36, Figs. 1 and 2, at the top of the furnace, communicates freely with the coarse-ore and coke passages, and with the intermediate passages for fine ore and regulating material, and discharges through an outlet pipe, 37, Figs. 1 and 4.

The tubes $o$, for circulating the CO and $CO_2$ gases within the furnace, extend from the coarse-ore passages $j$, outward into curbs, 38, which project inward to the gas spaces $m$ from outside the furnace; and rotary blowers, 39, in the form of electric fans, are located within the outer ends of said tubes and driven by electric motors, $x$, attached to the iron shell $b$ of the furnace; the blower tubes $o$ being so located as to keep the blowers from opposing one another.

The fine-ore passages $k$—$k'$ and gas spaces $m$ terminate at bottom in open ends within arched recesses, $y$, Fig. 3, and all the feed passages discharge into the working chamber by gravity.

Figure 8:
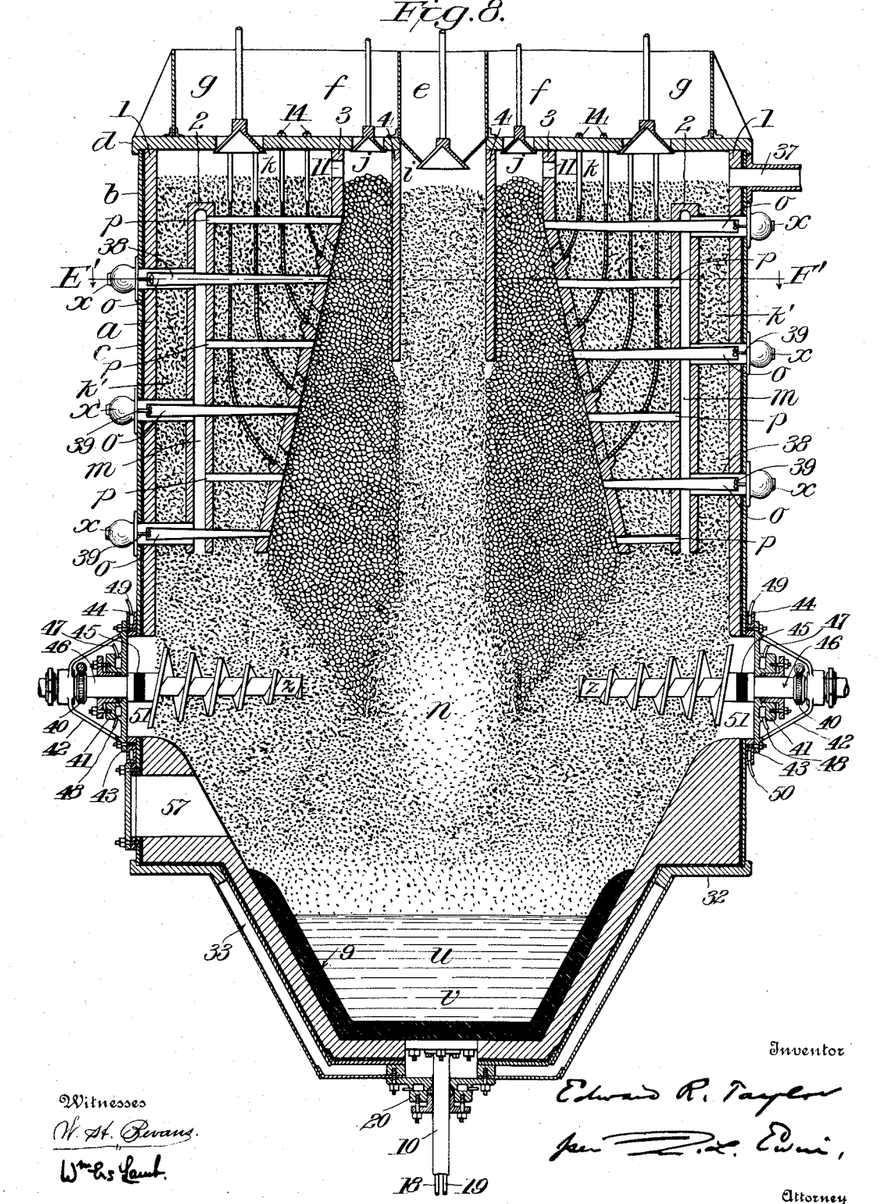
Fig. 8 is an axial vertical section, corresponding mainly with Fig. 2, showing rotary stoking screws.

To insure the inward feed of the ore to a sufficient extent, suitable stoking means may be provided beneath the several fine-ore passages $k$ and such means may consist of stoking screws, $z$, Fig. 8, rotated by means of worm gearing, 40, which may be driven by hand cranks or by electric motors; such screws $z$ having their main bearings in water-cooled stuffing boxes, 41, and outer bearings within yokes, 42, attached to the face plates, 43, which support said stuffing boxes, and between which and the iron shell $b$ water-cooled frames, 44, and ample insulation are interposed; the iron stem of each screw being also constructed with an insulating section, 45, of suitable asbestos compound or the like interposed between the inner portion of the screw and its outer stem, 46, to prevent the passage of the electric current outward through the screws. The inlet and outlet water connections of each stuffing box 41 and each water-cooled frame 44 are represented respectively in Fig. 8 at 47—48 and 49—50. The openings capped by the face-plates 43 and through which the stoking screws are inserted endwise into the furnace and withdrawn for renewal or repairs are represented at 51 in Fig. 8.

Figure 11:
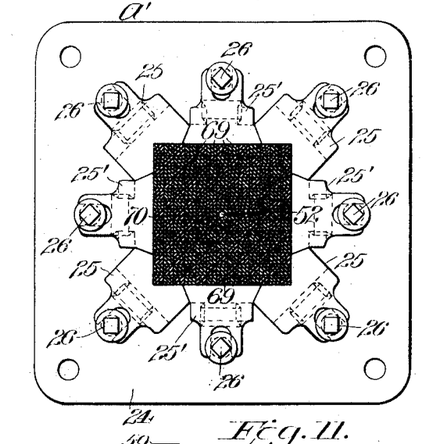
Figure 12:
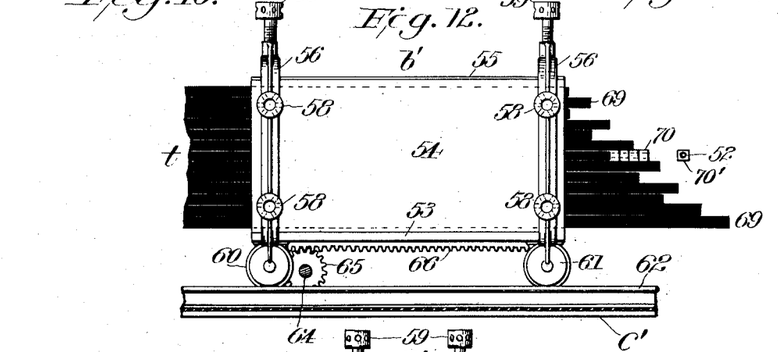
Figs. 12 and 13 are respectively a side elevation and a cross section of the electrode feeding device represented in Fig. 9.
Figure 13:
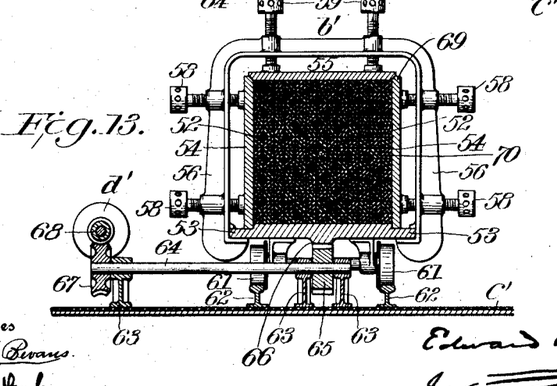

Passages, 52, Figs. 11, 12 and 13, with suitable connections, are provided, through which air or other suitable oxidizing material may be blown into the center of the working chamber $n$ at will.

One or more man holes, 57, Figs. 2, 3 and 8, suitably capped, and conveniently located, provide for entering the furnace after the working chamber and hearth are emptied and cooled for the renewal or repair of the electrodes and other like work, and may also be utilized in arranging the charge preliminarily.

In preliminarily charging the furnace, the hearth $u$ is filled with coke, and a column of coke is built up within the working chamber $n$ surrounded by coarse ore to a sufficient height to insure the completion of a continuous coke column extending from the bottom electrode $v$ to a point more or less near the upper ends of the top electrodes $w$. Simultaneously, after the plane of the main electrodes, $q$, $r$, $s$, $t$, is reached, fine ore may be fed in through the fine-ore hoppers, $g$, until the fine-ore passages, $k$—$k'$, are filled or substantially filled. The passages, 1, for regulating material, above the several main electrodes, $q$, $r$, $s$, $t$, may be filled at the same time or subsequently, and the streams of regulating material may be suitably directed over and in contact with the main electrodes, as shown in Fig. 1. The electric current is turned on, first through the secondary electrodes $v$ and $w$, and through the intervening column of coke, which is thus rendered incandescent. The current is then turned on through the main electrodes, $q$, $r$, $s$, $t$, and its supply to both sets from different dynamos as aforesaid, may be simultaneous throughout the reducing operation, or the secondary electrodes, $v$—$w$, may be used only occasionally as required.

The height to which the central coke column is kept incandescent may be determined by passing more or less current therethrough by way of said secondary electrodes as required, and that in turn determines the proportion of carbon in the molten metal as it reaches the hearth, and facilitates producing either pig iron or steel at will. The gas circulating blowers, $x^{39}$, are started as soon as the coke column is incandescent, so as to insure the conversion of the carbonic-oxid gas (CO) formed in the vicinity of the heat zone into carbonic acid ($CO_2$), the conversion of the latter into carbonic-oxid gas again, and so on alternately. Suitable fluxes are added to the several columns of ore and possibly to the coke, as may be required, and the supply of materials by way of the several hoppers, $e$, $f$, $g$, $h$, at the top of the furnace, is kept up so as to render the operation of the furnace substantially continuous.

Stoking may be resorted to occasionally as may be required to render the operation of the main electrodes, $q$, $r$, $s$, $t$, substantially uniform; as well as to regulate the feed of the fine ore inward to the heat zone.

The fluid metal is run off from time to time or continuously through the tap hole, 30, Fig. 1, and the molten slag through its outlet 31, Fig. 1. The discharge of gas through the pipe 37 at the top of the furnace may be continuous, and may, if desired, be promoted by an exhaust fan; the gas being stored, for use in engines or otherwise, in known or improved ways.

The electric connections may include suitable switches for varying the flow of the current through the main electrodes, $q$, $r$, $s$, $t$, as illustrated by Fig. 12 of my Patent No. 702117, dated June 10, 1902; and in like manner provision may be made for disconnecting the main electrodes from their normal source of supply and throwing them into circuit with the bottom electrode $v$, in order to melt out the contents of the hearth $u$ after temporarily suspending the operation.

The features of construction and mode of operation above briefly described are common to the present furnace and that set forth in said companion specification, and any and all patentable combinations of parts above particularly described are hereby disclaimed in favor of that specification and the other previous specification hereinbefore referred to.

In the present furnace the entire superstructure above the hearth is cylindrical externally, and in the upper feed portion the outer walls 1 and 2 are cylindrical instead of flaring downward as heretofore.

Figure 5:
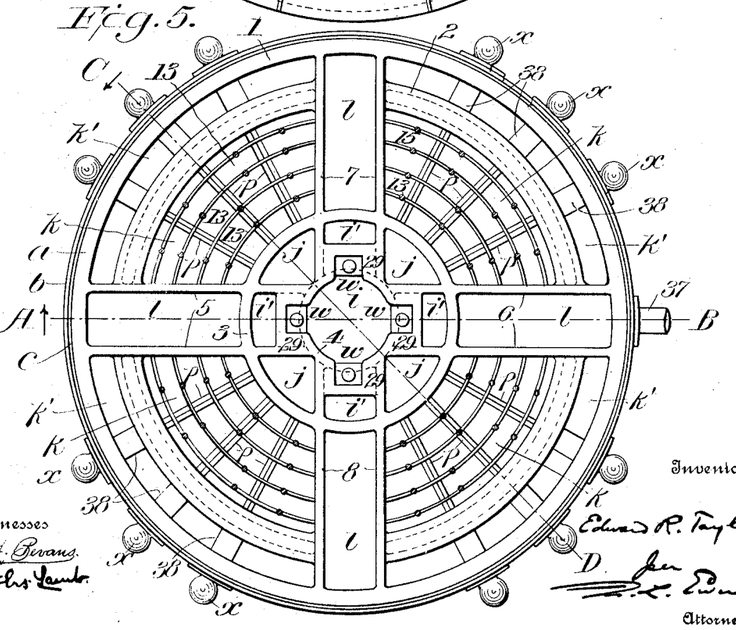

A top plate $d$, confined substantially as heretofore to the diameter of the top of the passage-forming body $a$ of the furnace, forms thus a hopper floor of largely increased area; and a relatively wide gas chamber, 36, beneath said top plate and above the closed upper ends of the hollow walls 2, is formed without special construction between the circular walls 1 and 3. The partition walls 5, 6, 7 and 8, which connect the circular walls 1 and 4, are preferably and conveniently extended upward to the top plate as shown in Fig. 5. The gas chamber 36 is thus divided into several compartments, which are connected with each other as with the spaces above the coke-column wings and coarse ore columns by holes 11 and 12, Figs. 1, 2 and 3, formed in the inner wall 3 and in said partitions respectively. More particularly, said cylindrical feed portion and said cylindrical outer walls 1 and 2 render vertical the peripheral feed passages, $k'$, for fine ore, and accommodate between the same and the downwardly flaring inner wall 3 a main feed passage, $k$, for fine ore, of largely increased capacity in each quarter of the furnace. Said main fine-ore passages $k$ are subdivided to any required extent by partitions, 13, Fig. 2, etc., of sheet metal or other suitable sheet material, suspended by bolts, 14, from the top plate $h$, and supported at their inwardly extending lower ends by ledges, 15, on the inner wall 3, immediately beneath openings, 16, of ample size in said inner wall, through which the several partitions direct their streams of fine ore into the outer edges of the coarse-ore columns, so as to mix with the coarse ore in transit any desired proportion of fine ore, for exposure therein to the CO and $CO_2$ gases passing back and forth through the coarse-ore columns into and out of the incandescent coke column.

In the species represented by Figs. 1 to 6 inclusive, with the aid of Figs. 10 to 13 inclusive, mechanical stoking means are dispensed with by the employment in their stead of inclines, $z'$, beneath the several columns of resistance regulating material and also beneath the several fine-ore columns, as shown respectively in Fig. 1 and in Figs. 2 and 3; such inclines being conveniently built as part of the passage-forming body $a$ with or without dead air chambers, 17, and with their effective faces in line with the sides of the hearth, $u$. Such inclines will in most cases suffice for bringing the material in toward the center of the working chamber, owing to the weight of the body of material above them and the absence of any obstruction to the inward movement of the ore.

The main electrodes $q\ r\ s\ t$ of all the species of the present furnace are stemless, as shown in Fig. 1 and Figs. 9 to 13 inclusive; each electrode consisting, as a whole, of a solid or substantially solid rectangular body of suitable electrode carbon. Special provision is required for the employment of horizontal electrodes of this form, owing to the size and weight required in a furnace adapted for reducing ore on a commercial scale. Each electrode is accordingly supported beneath, as near as practicable to its inner end, by a trunnioned horizontal roller, 21, preferably molded of suitable fire clay or cement and burned or baked; said roller having bearings of like or other suitable material in the floor of the embrasure, 22, in the body $a$ through which the electrode extends inward. For closing the coincident opening, 23, in the furnace shell $b$ around each electrode against the entrance of air and the escape of gas, and so as to provide if desired for the transmission of the electric current by the same means, a rectangular metallic collar, $a'$, is employed including a frame, 24, Figs. 10 and 11, fixedly attached to the shell $b$ and insulated therefrom, and provided internally with movable sections, 25—25', adapted to maintain the required contacts with the several sides of the electrode, with the frame and with each other under different adjustments, together with means for retracting such sections to free the electrodes, in the form of screws, 26, parallel with the electrode. The frame, 24, may conveniently be constructed with a cooling chamber, 24', Fig. 10.

Figure 9:
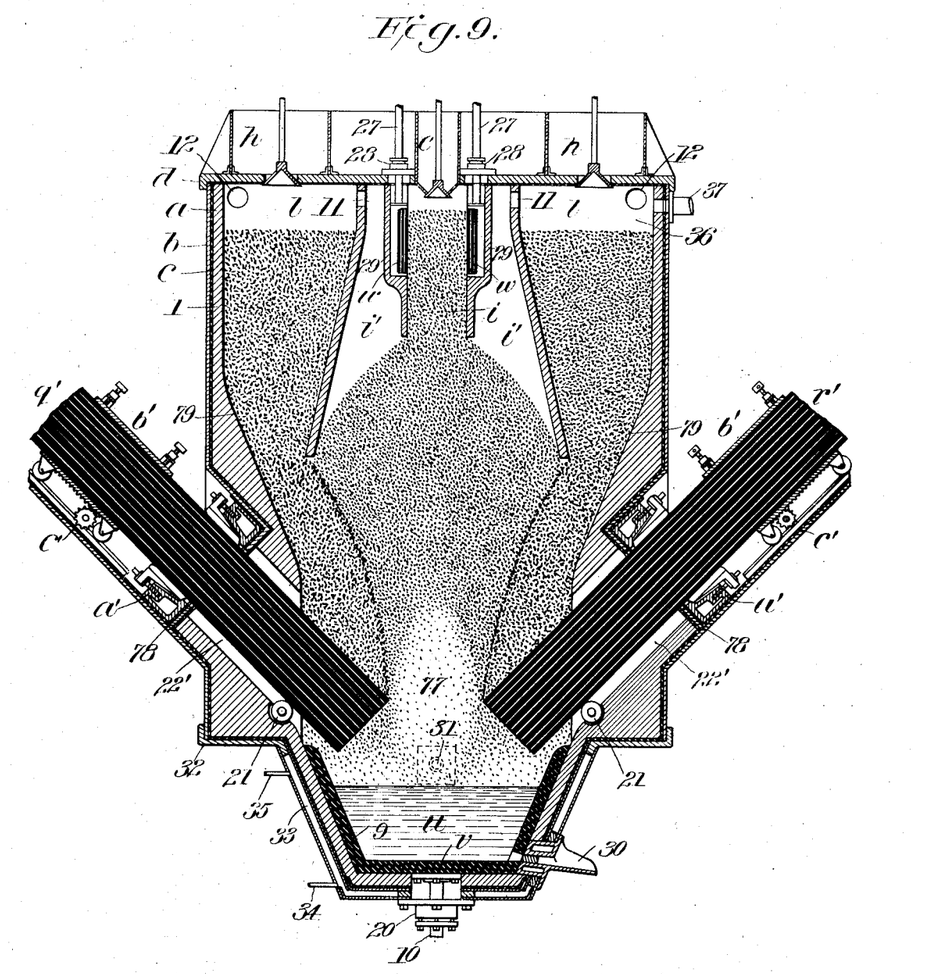
Fig. 9 represents an axial section corresponding mainly with Fig. 1, on a smaller scale illustrating the employment of inclined main electrodes and showing more fully the means for feeding the main electrodes.
Figure 10:
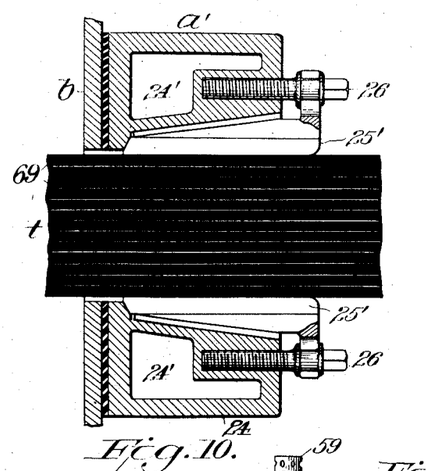
Figs. 10 and 11 are sectional detail views showing the construction of electrode clamp and gas check represented in Figs. 1 and 9, and the preferred construction of the main electrodes.

An electrode collar of above general description is shown in detail by Figs. 10 and 11, which see. The sections 25—25' in this specific construction are eight in number, and include corner sections, 25, which clamp the several corners of the electrode and side sections, 25', for the several sides constructed to interact with said corner sections as clearly shown in Fig. 11. The number of such sections may vary, and the construction of an electrode collar on the same principle may follow many lines as to details of construction. The construction of the electrode collar will be made the subject matter of a separate patent specification. Such electrode collars $a'$ may constitute the means for connecting the several main electrodes with the cables leading from the dynamos as indicated at 23' in Fig. 1, or they may serve merely as air and gas checks, the electric conductors being provided with suitable contact clamps, which may be of known construction. Provision is made for building such horizontal electrodes, $q$ or $q'$, $r$ or $r'$, $s$ and $t$ of the requisite large size *in situ* or practically *in situ*, and for feeding them lengthwise through the electrode collars as illustrated by Figs. 12 and 13 in connection with Fig. 9. Such means include endwise movable molds, $b'$, adapted to be used in the building up operation and also for feeding the electrodes through said electrode collars $a'$. Each of these molds $b'$ includes a horizontal platform 53, and relatively removable side and top members 54 and 55, together with transverse clamps, 56, provided with jack screws, 58 and 59, which are perpendicular to said side and top members respectively when the latter are in place as in Figs. 12 and 13. The mold $b'$ is conveniently mounted on car wheels, 60, 61, having axles transverse to the mold and to the electrode, which run on rails, 62, beneath the electrode, leading to the adjacent side of the furnace and supported by a suitably insulated floor, $c'$. This floor also supports, in suitable bearings, 63, a horizontal shaft, 64, carrying a pinion, 65, between said rails, which is in mesh with a rack, 66, on the bottom of the mold platform. Suitable means for rotating such shaft may consist of worm gearing, 67, connecting it with the shaft 68 of a small electric motor, $d'$, or its equivalent. The mold $b'$ moves bodily forward with the electrode in the feeding operation. It is shown in Fig. 12 as it appears immediately after having been closed and before moving it to any appreciable extent. After the mold is moved in successive feeding operations until its rear wheels 61 reach said feed shaft 64, the mold is taken apart by removing said clamps 56 and removable members 54 and 55, and the operation of building the electrode is resumed.

Each horizontal electrode is composed of a large number of relatively small units, 69, 70, Figs. 11–13, rectangular in cross section, including a central tubular unit, 70, to form said passage 52 for the introduction of oxidizing material. This tubular unit 70 is preferably and conveniently composed of relatively short sections, 70′, Fig. 12, of fire clay or the like, so as to be incombustible and at the same time adapted to be kept open by the sloughing off which occurs at the inner end of the electrode. The other units, 69, are of suitable electrode carbon. In building up the electrode, the platform 53 of the mold $b'$ having been exposed and properly located for this operation, the units are built up thereon layer by layer; care being taken to have the sections or lengths of the carbon units 69 break joint longitudinally as at the right in Fig. 12, and a suitable carbon cement, which may be composed of ground carbon and molasses, is spread between the layers as the work progresses. The operation proceeds in this manner until a sufficient length has been built up to fill or refill the mold $b'$. The side and top pieces 54 and 55 of the mold $b'$ are then applied, being first loosely held in place by the retracted jack screws of the clamps 56, and ultimately brought together and to gage, as in Fig. 13, by tightening the jack screws 58 and 59 in proper order so as to render the electrode rectangular and of the required dimensions. The mold $b'$ is now ready to be used in the feeding operation, as above described, and when it has again reached the position represented in Fig. 12 it is again retracted and the building operation resumed, and so on indefinitely. It is of course necessary to stop the current for renewing the electrodes, but this involves very little delay in working the furnace as compared with the withdrawing and replacing of horizontal electrodes as heretofore constructed.

Figure 7:
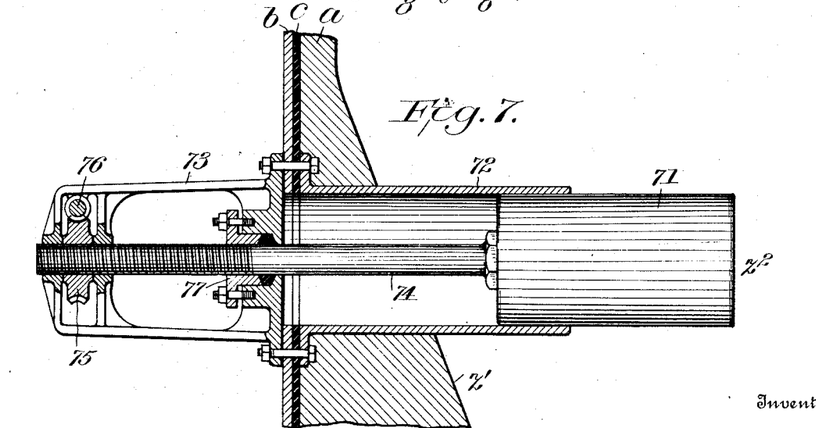
Fig. 7 represents a sectional elevation on a larger scale of a reciprocating stoker.

The modification represented by Fig. 7 consists in the substitution for said inclines $z'$, Figs. 2 and 3, beneath the several fine-ore passages $k$—$k'$ and for the rotary stoking screws $z$, Fig. 8, of a reciprocating stoker, $z^2$, beneath each fine-ore passage, or, preferably the provision of each of said inclines $z'$ beneath the fine-ore passages with a stoker $z^2$ of this form, if the ore to be treated needs such mechanical stoking. The specific stoker represented consists of a cylindrical plunger, 71, Fig. 7, and an open ended cylinder, 72, which may be molded of fire clay or a suitable cement composition, an external frame, 73, bolted with said cylinder to the furnace shell $b$, a stem, 74, attached at its inner end to said plunger and having a screw-threaded outer end, a rotatable nut, 75, in the form of a worm wheel, means for rotating said nut including a worm, 76, in mesh with its worm teeth, and a stuffing box, 77, forming part of said frame. The plunger 71 is shown at the inner limit of its stroke. Having reached this position it is run back within the cylinder 72, and again advanced from time to time as required. The shaft of said worm 76 may be that of a small electric motor or any preferred driving means.

The species represented by Fig. 8 may be identical with the first species represented by Figs. 1–6 and Figs. 10–13 excepting its rotary stoking screws $z$ and their accessories already described.

In the species represented by Fig. 9 the "horizontal" electrodes, two of which are shown at $q'$ and $r'$, are of the inclined type, arranged to dip in the slag at the top of the hearth $u$ more or less as desired, and the figure illustrates the adaptation of the electrode collars $a'$ and feeding means $b'$—$d'$, Figs. 10–13, to control such inclined electrodes of any required size. For the accommodation of such electrodes the body $a$ and shell $b$ are modified so as to form inclined seats, 78, at right angles to embrasures, 22′, of the required slant; and so as to form suitable inclines, 79, above the several electrodes down which the resistance regulating material will flow from the passages $l$. Otherwise all the features of construction represented in Fig. 9 have already been described with reference to Figs. 1–6 and Figs. 10–13.

Excepting the novel combinations of parts above described and hereinafter claimed, the present furnace is preferably of the construction more particularly set forth in said companion specification and its accompanying drawings, but for the purposes of the present invention may be of any known or improved construction consistent with said novel combinations of parts respectively.

In operating the furnace some of the blowers $x$ may be reversed with reference to the others so as to insure the circulation of the CO and $CO_2$ gases in the most effective manner, including the return of the gases from the upper part of the working chamber to lower planes where the temperature of the ore is appropriate to immediate reduction of ore to metal; and other like modifications in the operation of the furnace as in its construction will suggest themselves to those skilled in the art.

Having thus described said improvement,

I claim as my invention, and desire to patent under this specification:

1. An electric smelting furnace of the stack type having, in combination, a suitable hearth, a superstructure of suitable heat-resisting material inclosing a working chamber above the hearth and constructed with a cylindrical upper feed portion including a cylindrical outer wall and cylindrical walls concentric therewith forming between them vertical feed passages for heat-conserving streams of ore on its way to the heat zone, a central circular wall inclosing a vertical flue-shaped coke passage and a downwardly flaring circular wall separating inner and outer ore passages surrounding said coke passage, and horizontal electrodes extending into the working chamber immediately above the hearth; said passages discharging in common into the working chamber by gravity.

2. An electric smelting furnace of the stack type having, in combination, a suitable hearth, a superstructure of suitable heat-resisting material inclosing a working chamber above the hearth and constructed with a cylindrical upper feed portion including a cylindrical outer wall and cylindrical walls concentric therewith forming between them vertical feed passages for heat-conserving streams of ore on its way to the heat zone, a central circular wall inclosing a vertical flue-shaped coke passage and a downwardly flaring circular wall and radial partitions separating and dividing inner and outer ore passages surrounding said coke passage, and horizontal electrodes extending into the working chamber immediately above the hearth; said passages discharging in common into the working chamber by gravity.

3. An electric smelting furnace of the stack type having, in combination, a structure of suitable heat-resisting material inclosing the working chamber and constructed with a cylindrical upper feed portion including a cylindrical outer wall and cylindrical walls concentric therewith forming between them vertical feed passages for heat conserving streams of ore on its way to the heat zone, a central circular wall at the top of the furnace inclosing a vertical flue-shaped coke passage and a downwardly flaring circular wall separating inner and outer ore passages surrounding said coke passage, means for passing the electric current through the charge within the working chamber, a horizontal top plate supported by said structure and provided with superposed hoppers in communication with the upper ends of said coke passage and said ore passages respectively, and a hearth beneath the working chamber provided with means for discharging metal and slag in fluid condition.

4. An electric smelting furnace of the stack type having, in combination, a structure of suitable heat-resisting material inclosing the working chamber and constructed with a cylindrical upper feed portion including a cylindrical outer wall and cylindrical hollow walls concentric therewith forming between them vertical feed passages for heat-conserving streams of ore on its way to the heat zone, a central circular wall inclosing a vertical flue-shaped coke passage and a downwardly flaring circular wall separating inner and outer ore passages surrounding said coke passage, means for passing the electric current through the charge within the working chamber, means for circulating the gases within the furnace including gas spaces within said hollow walls, a horizontal top plate supported by said structure, provided with superposed hoppers in communication with the upper ends of said coke passage and said ore passages respectively, and forming the top of the furnace and of a gas chamber in communication with said coke passage and said ore passages, and a discharge pipe leading from said gas chamber.

5. An electric smelting furnace of the stack type having, in combination, a suitable hearth, a superstructure of suitable heat-resisting material inclosing a working chamber and constructed with a cylindrical upper feed portion including a central circular wall inclosing a vertical flue-shaped coke passage, a downwardly flaring and apertured circular wall separating inner and outer ore passages surrounding said coke passage and radial partitions dividing said ore passages, a horizontal top plate supported by said superstructure and provided with feed openings in communication with the upper ends of the respective ore passages, and partitions beneath said top plate subdividing portions of said outer ore passages into chutes leading severally to apertures in said downwardly flaring wall.

6. An electric smelting furnace of the stack type having, in combination, a suitable hearth, a superstructure of suitable heat-resisting material inclosing a working chamber and constructed with a cylindrical upper feed portion including a central circular wall inclosing a vertical flue-shaped coke passage, a downwardly flaring and apertured circular wall separating inner and outer ore passages surrounding said coke passage and radial partitions dividing said ore passages, a horizontal top plate supported by said superstructure and provided with feed openings in communication with the upper ends of the respective ore passages, and partitions of suitable sheet material suspended from said top plate subdividing portions of said outer ore passages into chutes leading severally to apertures in said downwardly flaring wall.

7. An electric smelting furnace of the stack type having, in combination, a structure of suitable heat-resisting material inclosing the working chamber and constructed with a cylindrical upper feed portion including a cylindrical outer wall and cylindrical walls concentric therewith forming between them vertical feed passages for heat conserving streams of ore on its way to the heat zone, a central circular wall inclosing a vertical flue-shaped coke passage, a downwardly flaring circular wall separating inner and outer ore passages surrounding said coke passage and radial partitions dividing said inner and outer ore passages, a horizontal top plate supported by said structure and provided with feed openings in communication with the upper ends of said coke passage and said ore passages respectively, means beneath the several outer ore passages at the sides of the working chamber for contracting the charge to the required extent in the vicinity of the heat zone, and a hearth beneath the center of the working chamber provided with means for discharging metal and slag in fluid condition.

8. An electric smelting furnace of the stack type having, in combination, a structure of suitable heat-resisting material inclosing the working chamber and constructed with a cylindrical upper feed portion including a cylindrical outer wall and cylindrical walls concentric therewith forming between them vertical feed passages for heat-conserving streams of ore on its way to the heat zone, a central circular wall inclosing a vertical flue-shaped coke passage, a downwardly flaring circular wall separating inner and outer ore passages surrounding said coke passage and radial partitions dividing said inner and outer ore passages, a horizontal top plate supported by said structure and provided with feed openings in communication with the upper ends of said coke passage and said ore passages respectively, a hearth of less diameter beneath the center of the working chamber provided with means for discharging metal and slag in fluid condition, and inclines beneath the several outer ore passages at the sides of the working chamber extending inward and downward in line with the sides of the hearth.

9. An electric smelting furnace of the stack type having, in combination, a suitable hearth, a superstructure having a metallic shell inclosing a working chamber above said hearth and feed passages discharging into said working chamber, stemless horizontal electrodes of the requisite size rectangular in cross section extending into said working chamber immediately above said hearth, and metallic electrode collars including rectangular frames fixedly attached to said shell and suitably insulated therefrom, movable sections within said frames tightly closing the openings around the several electrodes, and means for retracting said sections to free the electrodes.

10. An electric smelting furnace of the stack type having, in combination, a suitable hearth, a superstructure having a metallic shell inclosing a working chamber above said hearth and feed passages discharging into said working chamber, stemless horizontal electrodes of the requisite size rectangular in cross section extending into said working chamber immediately above said hearth and metallic electrode collars including rectangular frames fixedly attached to said shell and suitably insulated therefrom, movable sections within said frames tightly closing the openings around the several electrodes, means for retracting said sections to free the electrodes, and means for feeding the electrodes endwise through said collars to take up wear.

11. An electric smelting furnace of the stack type having, in combination, a suitable hearth, a superstructure having a metallic shell inclosing a working chamber above said hearth and feed passages discharging into said working chamber, stemless horizontal electrodes of the requisite size rectangular in cross section extending into said working chamber immediately above said hearth, and metallic electrode collars including rectangular frames fixedly attached to said shell and suitably insulated therefrom, movable sections within said frames tightly closing the openings around the several electrodes, means for retracting said sections to free the electrodes, and means for adapting the electrodes to be built *in situ* and for feeding them endwise through said collars to take up wear.

12. An electric smelting furnace of the stack type having, in combination, a suitable hearth, a superstructure inclosing a working chamber above said hearth and feed passages discharging into said working chamber, stemless horizontal electrodes of the requisite size rectangular in cross section and built up of relatively small rectangular carbons breaking joint longitudinally and cemented and compressed into a practically homogeneous mass, electrode collars having movable sections which normally close the openings around the several electrodes, means for retracting said sections to free the electrodes, and means for adapting the electrodes to be built *in situ* and for feeding them endwise through said collars.

13. An electric smelting furnace having, in combination, a suitable hearth, a superstructure inclosing a working chamber above said hearth and feed passages discharging into said working chamber, stemless horizontal electrodes of the requisite size rectangular in cross section built up of relatively small rectangular carbons breaking joint longitudinally and cemented and compressed into a practically homogeneous mass. electrode collars including movable sections at the several sides of each electrode, means for retracting said sections to free the electrodes, and means for feeding said electrodes endwise through said collars including an endwise movable mold adapted to be used in the building up operation and provided with clamping devices for compressing the electrode vertically and transversely and for keeping its parts in place during the feeding operation.

14. In an electric smelting furnace, a stemless horizontal electrode rectangular in cross section built up of relatively small rectangular units including a tubular unit which forms a longitudinal passage for the introduction of oxidizing material therethrough.

15. In an electric smelting furnace, a stemless horizontal electrode rectangular in cross section, composed of relatively small rectangular units including a central tubular unit of fire clay or the like in short individually detachable sections built into the electrode and forming a longitudinal passage for the introduction of oxidizing material therethrough, the other units being of electrode carbon, substantially as hereinbefore specified.

EDWARD R. TAYLOR.

Witnesses:
WILLIAM N. WISE,
JOHN J. RUDMAN.